No. 695,681. Patented Mar. 18, 1902.
I. FOX.
NOSE PIECE FOR SPECTACLES OR EYEGLASSES.
(Application filed Mar. 5, 1901.)

(No Model.)

WITNESSES:
Arthur E. Paige
F. Norman Dixon

INVENTOR:
Ivan Fox
by his attorney

UNITED STATES PATENT OFFICE.

IVAN FOX, OF LANSDOWNE, PENNSYLVANIA.

NOSEPIECE FOR SPECTACLES OR EYEGLASSES.

SPECIFICATION forming part of Letters Patent No. 695,681, dated March 18, 1902.

Application filed March 5, 1901. Serial No. 49,680. (No model.)

*To all whom it may concern:*

Be it known that I, IVAN FOX, a citizen of the United States, residing at Lansdowne, in the county of Delaware and State of Pennsylvania, have invented certain new and useful Improvements in Nosepieces for Spectacles or Eyeglasses, of which the following is a specification.

It is the object of my invention to provide, for employment upon eyeglasses and spectacles, nose pieces, capable of being fitted to noses of any configuration, of such construction and arrangement as to be secure and comfortable to the wearer.

In the accompanying drawings I show, and herein I describe, a good form of a convenient embodiment of my invention, the particular subject-matter claimed as novel being hereinafter definitely specified.

In the accompanying drawings.

Similar letters of reference indicate corresponding parts.

In the accompanying drawings, $a$ are the lenses, $b$ the clasps and lens posts, and $c$ the bow spring, of a pair of eye glasses.

My improved nose pieces consist each of an approximately U-shaped loop of suitable metal, and are conveniently formed by bending up a flat strip of metal previously cut by a die or otherwise to the desired shape.

The free leg $e$ of each nose piece merges at its end into an enlargement $f$, which extends edgewise rearwardly more or less according to adjustment, out of the plane of the lenses, is preferably of approximately oval form, and conveniently of breadth about twice that of the strip.

Said enlargement and free leg, although in the fitting operation to be given such curvature as may be necessary to cause them to conform to the wearer's nose, are to be considered as existing in approximately a common plane, that is to say, as together constituting a plate or sheet of metal.

The enlargement, which constitutes a bearing plate, is provided with a large central aperture $g$ shown as corresponding in outline with its own. Said aperture is conveniently of a breadth about equal to that of the strip of which the body of the U-shaped loop is formed.

The nose pieces may be attached by screws or pivots passing through the upper ends of their basal legs $d$ and into the lens posts, or other portions of the spectacle or eye glass frame or mounting. When in position the bight of the U-shaped loop depends below the screw, pivot, or other device employed to secure the nose piece in position. By reason of the rearward adjustment or set of the enlargement $f$, it is out of line with the upper end of the basal leg, that is to say, is, when the device is in use upon a spectacle or eye glass, nearer the plane of the eyes of the wearer than is the upper end of the basal leg.

When the nose pieces are mounted as stated, the free legs $e$ may be lengthened or shortened to the better fit a wearer, by such manipulation of the metal as will shift the position of the bight $h$ relatively to the length of the strip; said free leg as well as the basal leg may be set at any desired angle with relation to the plane of the lenses to fix and determine the position of the bearing plate, and said plate itself may be adjusted toward and from the plane of the lenses by manipulation of the neck $i$ by which it is connected to the free leg. Apart from the movement or adjustment of said leg, and said plate as a whole, said plate may as to its different parts be adjusted or bent to a set other than that illustrated.

Figure 1:
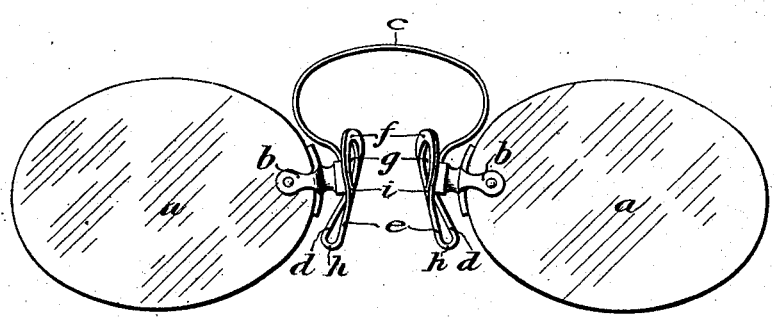
Figure 1 is a view in rear elevation of a pair of eye glasses equipped with nose pieces embodying my invention.
Figure 2:
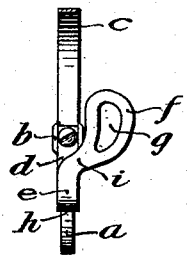
Figure 2 is a view in end elevation of one of the lenses and nose pieces shown in Figure 1, sight being taken toward the inner end of the lens.
Figure 3:
Figure 3 is a plan view of a blank from which a complete nose piece may be formed.

In addition to adjustment toward and from the plane of the lenses, the different parts of the nose pieces may be adjusted toward and from the nose of the wearer, and the plates may be given, as shown in Fig. 1, a curvature in which their respective upper inner portions are, to the better conform to the wearer, further apart than their lower portions, while the lower portions of the loops may also be as shown bent bodily away from each other or otherwise to present the acting faces of the bearing plates in contact with such part of the nose of the wearer as may best secure the desired result.

The openings in the bearing plates are of such area that in use the skin or fleshy parts of the nose of the wearer will project bodily slightly thereinto, whereby the hold of the nose pieces will be reinforced, a result not possible where minute openings are resorted to.

While I do not herein illustrate my nose piece as provided, as to the bearing plate and the free leg which act against the nose of the wearer, with the celluloid or other facings largely employed in connection with nose pieces, and in fact, with my present knowledge, prefer not to employ them, it is to be understood that I do not exclude the application of facings to the structure herein claimed, provided only that they be not so applied as to close the skin receiving opening.

Two factors must be taken into account in the fitting of the lenses, that is to say, the necessity for supporting the lenses in proper position with respect to the eyes, and the desirability of setting the nose pieces at such position upon the nose of the wearer that they will take a secure hold. As these two positions both vary in different individuals, and possess no fixed relation, it has been difficult to accomplish both desiderata with nose pieces as heretofore constructed.

My improved nose pieces, however, possess such a range of adjustment that they may be bent to present against that part of the nose of the wearer where they take the most secure hold, while at the same time the lenses may be set at any desired position with respect to the eyes.

The precise diameter of the skin receiving apertures in the enlargements, is a matter within the province of the constructor. I employ apertures of about the size, proportionately to the other parts, illustrated in the drawings. The character of the skin is such that a minute opening is not adapted to receive and take a grasp upon it. The opening must be of considerable magnitude else a mass of the skin will not enter it. It is to be understood, therefore, that in claiming skin receiving apertures, I intend to cover openings bearing approximately the same relation, as to size, to the nose piece, as do the openings shown in the drawings bear to the nose piece therein depicted, and intend the words 'skin receiving openings' to exclude openings materially smaller, proportionately, than the openings depicted.

Having thus described my invention, I claim—

1. A nose piece for a spectacle or eye glass, the same consisting of a U-shaped loop formed from a strip of plate metal, one leg of which is adapted to be attached to a lens, lens frame, or mounting, and the other provided with an enlarged bearing plate arranged at its upper end and forming a direct continuation of it, but out of line with the upper end of the first mentioned or basal leg, said bearing plate and its leg existing in approximately the same plane so that in use both are in acting contact with the nose of the wearer, and said bearing plate embodying a large skin receiving opening, substantially as set forth.

2. A nose piece for a spectacle or eye glass, the same consisting of a U-shaped loop formed from a strip of plate metal, one leg of which is adapted to be attached to a lens, lens frame, or mounting, and the other provided with an enlargement constituting a bearing plate arranged at its upper end and forming a direct continuation of it, but set out edgewise from it, said bearing plate and leg existing in approximately the same plane so that in use both are in acting contact with the nose of the wearer, and said bearing plate embodying a large skin receiving aperture cut directly through it, substantially as set forth.

In testimony that I claim the foregoing as my invention I have hereunto signed my name this 24th day of January, A. D. 1901.

IVAN FOX.

In presence of—
S. SALOME BROOKE,
THOS. K. LANCASTER.